Sept. 14, 1943.　　　G. E. HILL ET AL　　　2,329,612
APPARATUS FOR TRAINING AIRCRAFT PILOTS
Filed May 1, 1942　　　3 Sheets-Sheet 1
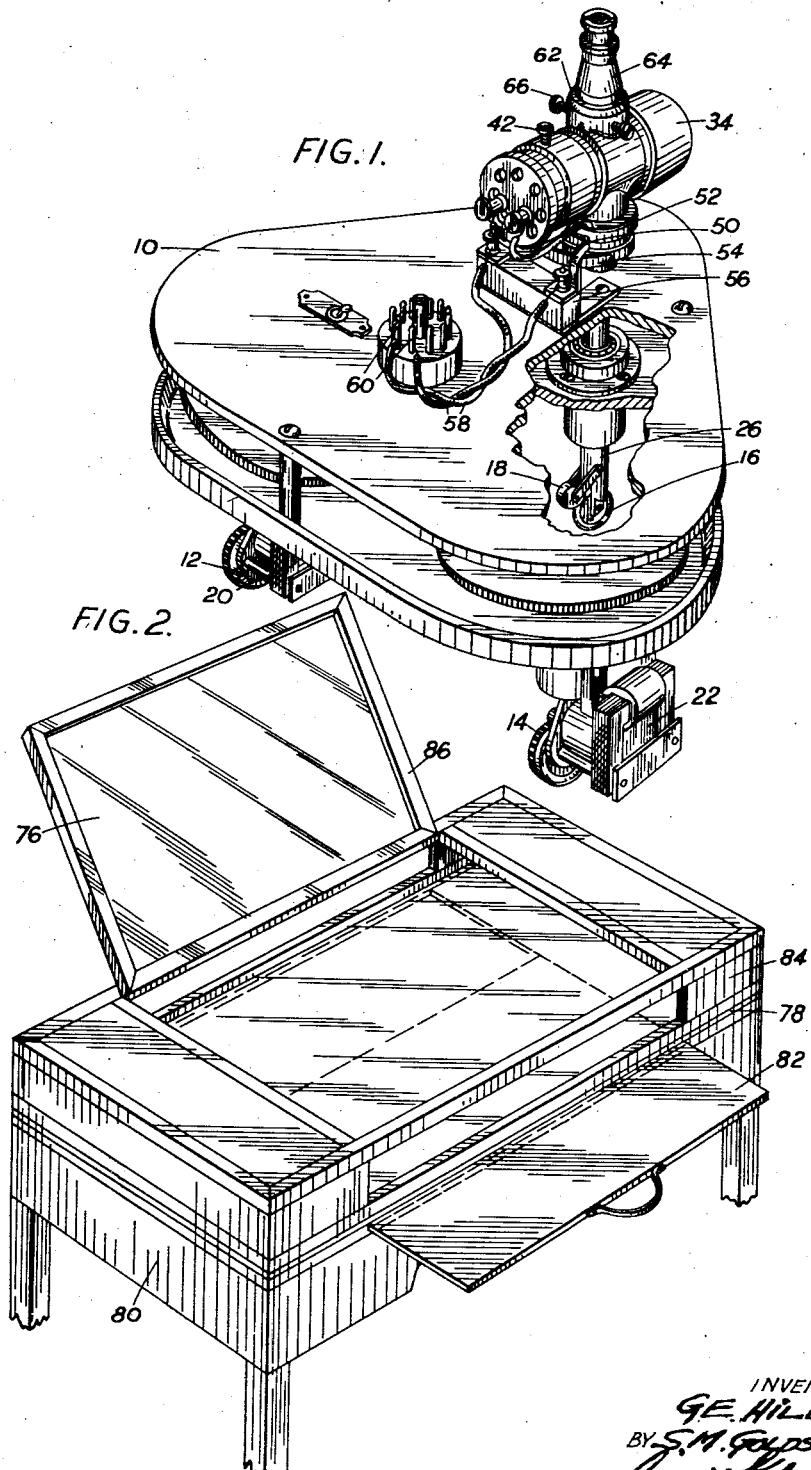
INVENTORS
G. E. HILL
BY S. M. GOLDSMITH
ATTORNEYS

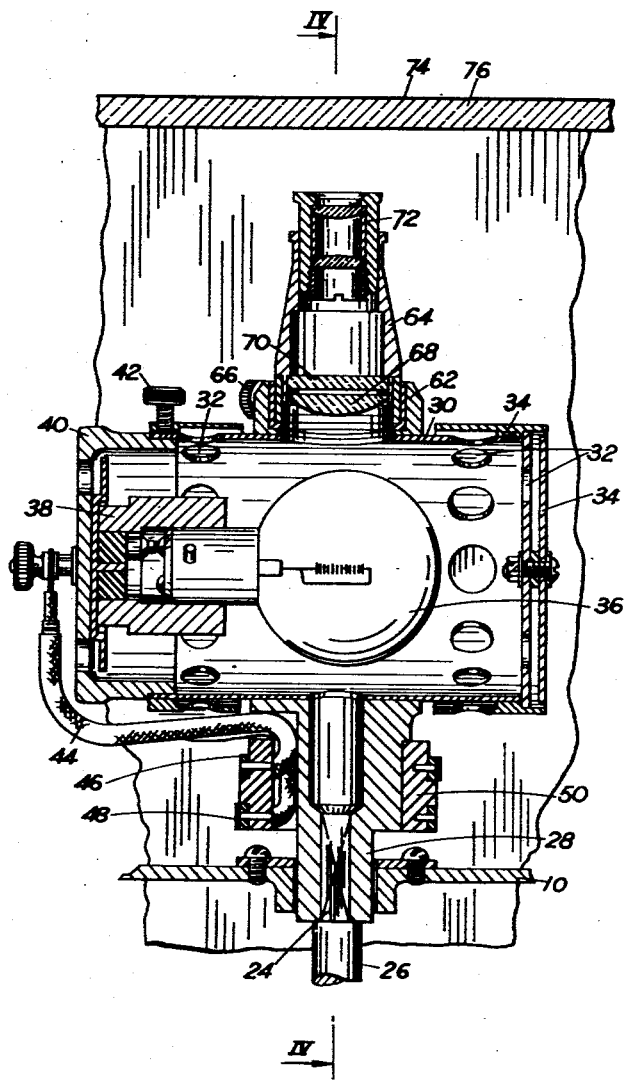

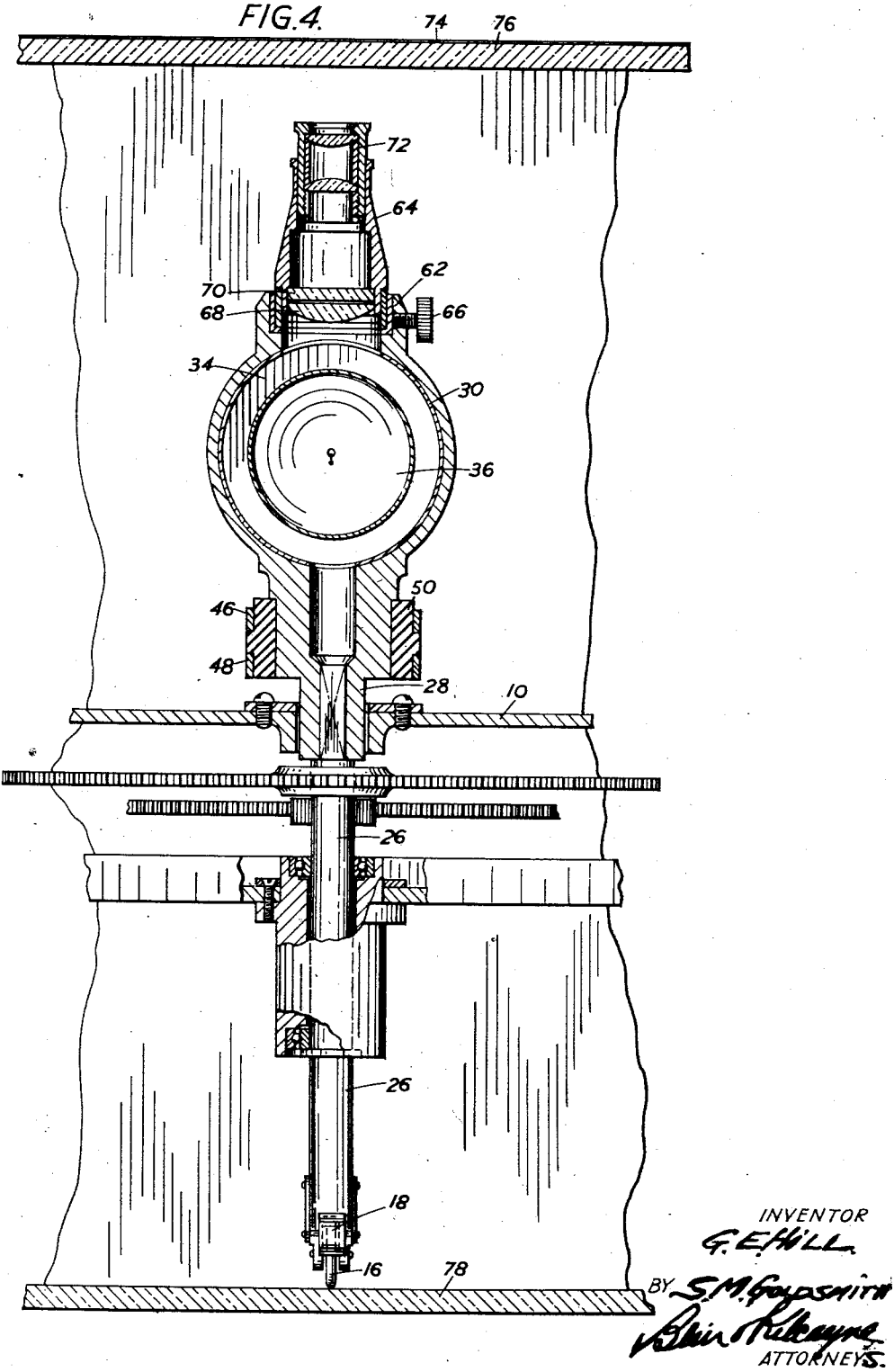

Patented Sept. 14, 1943

2,329,612

UNITED STATES PATENT OFFICE 2,329,612

APPARATUS FOR TRAINING AIRCRAFT PILOTS

George Edmund Hill, New Barnet, and Sydney Mansfield Goldsmith, London, England

Application May 1, 1942, Serial No. 441,404
In Great Britain May 28, 1941

6 Claims. (Cl. 35—12)

This invention relates to apparatus for training aircraft pilots on the ground of the kind comprising an aircraft cockpit provided with control column, rudder bar and instruments, which is movably mounted so as to simulate the movements of an actual aircraft and is connected to a distant course recorder movable across a flat surface to trace the course "flown" by the pupil under instruction.

The course-recorder traces a line upon the map on which it is placed and this line can be examined afterwards. As, however, the recorder stylus is hidden by the body of the recorder its movements cannot be watched by other pupils during the actual recording operation. It is the object of the present invention to remedy this deficiency.

According to this invention an optical projector is mounted on the recorder and a frame for an additional map is supported above the table on which the recorder stands, whereby a spot of light or an image of an aircraft silhouette can be projected on the underside of a second map, thereby rendering visible to a number of persons in the room the course actually being "flown" by the pupil.

The projector may be either a diascope or an episcope, but it is preferred to employ a diascope consisting of a housing for a lamp, a condenser, a transparency or apertured diaphragm, and a projecting lens. This apparatus is mounted with its optical axis vertical on the upper end of the marking-wheel spindle of the course recorder so that it rotates with this spindle as a consequence of turning movements of the cockpit. It is provided with two slip-rings upon which bear two brushes mounted on the body of the recorder so that current can be supplied to the lamp in all positions of the projector. The transparency is a small aircraft silhouette an image of which is projected by the projecting lens. Instead of a glass transparency a metal plate may be used with an aperture cut out to the required shape.

The existing training apparatus includes a table with a sliding map tray and a sheet of glass covering the map over the surface of which the recorder travels. This table is supplemented according to this invention by a frame for an additional glass sheet upon which a second map or chart may be placed, this sheet being preferably hinged so that it can be lifted and swung back. This frame is of such a height that the second map or chart is a short distance above the projecting lens, to receive the image of the silhouette in the primary focus of the projecting lens. The paper of the map or chart being translucent, the image can be seen from above, and it will be evident that its movements are the same as the movements of the marking wheel across the map or chart on the table beneath.

The nose of the silhouette of course always points in the direction of its movements.

Referring to the accompanying drawings—

Figure 1 is a perspective view of a well known type of course recorder fitted with projecting apparatus according to this invention;

Figure 2 is a perspective view of the map table with which the projecting course recorder cooperates;

Figure 3 is a side elevation in section of the projecting apparatus; and

Figure 4 is a section on the line IV—IV in Figure 3.

Figure 1 represents the course-recorder forming part of the well known "Link" training apparatus. It comprises a frame 10 supported on three wheels 12, 14, 16, of which the wheel 16 is a marking wheel supplied with ink from an inking roller 18. All three wheels are carried by vertical spindles which are geared together so that they are constrained to rotate always to the same extent and their rotation is controlled by the turning of the trainer properly so-called which is an imitation of an aircraft with the usual controls and instruments, which the pupil can steer and control in the same way as an actual aircraft is steered and controlled. The wheels 12, 14 are driven continuously by means of electric motors 20, 22 to cause the recording apparatus to travel across the surface on which it rests. The marking wheel 16 will therefore trace a line on this surface in ink, which represents the course which a real aircraft would have flown at an assumed constant speed if controlled in the manner in which the pupil controls the trainer. The mechanism whereby these operations are effected is not shown, nor is any description of it necessary because it is well known and moreover it forms no part of the present invention.

The upper end 24 of the vertical spindle 26 carrying the marking wheel 16 is shaped to a square cross-section as indicated in Figures 3 and 4. A socket 28 is formed with a hole of square cross-section which fits over the part 24 of this spindle. The socket supports a lamp housing 30 formed with ventilating holes 32 and with shields 34 which prevent the escape of direct light from a lamp 36 supported in the housing 30. This lamp is conveniently a car head-lamp bulb of standard construction having a bayonet cap which is held in a socket 38 carried by a detachable cap 40 fitting into one end of the lamp housing, this cap being held in place by a set-screw 42. The pins of the lamp socket 38 are connected by wires 44 to two slip-rings 46, 48 carried by a sleeve 50 of insulating material surrounding the socket 28. Two brushes 52, 54 bear on the slip rings 46, 48 respectively, these brushes being carried by a block 56 of insulating material fixed to the frame 10 and connected by wires 58 to two of the contact pins 60 by which electric current is supplied to the recording device. In this way the circuit through the lamp is completed.

At the top of the housing 30 is a socket 62 in which fits a tube 64 which is held in place by a set screw 66. At the lower end of this tube 64 is a condenser lens 68 immediately above which is a transparency 70 consisting of the silhouette of an aircraft, the aircraft itself being represented by transparent glass and the background being opaque. The upper end of the tube 64 receives a projecting lens 72 of short local length which forms an image of the silhouette a short distance (for example three-quarters of an inch) above the top of the lens mount. This projecting lens is shown as a non-achromatic doublet similar in form to a Ramsden eyepiece. Although this does not form an image completely free from chromatic aberration this is immaterial for the purposes of this invention. This lens could, however, be of any other form, for example a microscopic objective, if desired.

The image of the silhouette is received upon the under surface of a translucent map 74 lying upon a sheet of glass 76. The recording apparatus travels across the surface of a sheet of glass 78 (Figure 2) supported on a table 80 the top of which is recessed to receive a sliding map tray 82 on which any one of a number of maps can be placed. The glass sheet 76 is supported by a detachable wooden frame 84 to one edge of which is hinged a frame 86 in which the sheet 76 is supported. The hinging of the frame 86 enables the sheet 76 to be swung back to allow the course recorder to be placed on the sheet 78 and removed therefrom. The sheet 76 when lowered is parallel to the sheet 78 and is at such a height above it that the image of the silhouette is in focus upon the map 74 resting upon the sheet 76. This map is of course a duplicate of the one supported on the map tray 82 and the two maps are in register with one another so that a movement of the image of the silhouette on the upper map corresponds to the movement of the marking wheel over the lower map.

It will be evident that a number of persons can watch the image of the silhouette moving across the upper map and can, therefore, observe directly any errors of flying committed by the pupil who is in control of the trainer. The instruction conveyed to them in this way is more direct and more vivid than that which they obtain by inspecting the ink trace on the glass sheet 78 after the "flight" has been concluded and the course recorder has been removed from the glass sheet 78.

It will be evident that owing to the rotation of the spindle 26 the nose of the aircraft silhouette always points in the direction of "flight" and this is advantageous because the movement across the map is performed at quite a low speed. It would, however, be within the invention to employ a circular spot of light thrown by a projector fixed to the frame 10, instead of an aircraft silhouette. The movements of this spot of light would correspond to the movements of the marking wheel, but it would not give any indication of the direction in which the aircraft is heading other than the movement itself.

We claim:

1. Aircraft training apparatus including a moving course recorder connected automatically to travel in accordance with the movements of the controls of the trainer, a translucent map supported above the course recorder, optical means for causing a representation of an aircraft to be projected upon the under surface of said map, means interconnecting said optical means and said course recorder, and means operatively interconnecting said recorder and said aircraft representation so that the latter always heads in the direction of travel of the recorder.

2. In combination with a turnable trainer, controls therefor, a moving course recorder for indicating any direction of travel, optical means for projecting a representation of an aircraft, a translucent map supported above said recorder and receiving said representation, and means for interconnecting said recorder and said optical means automatically to cause said aircraft representation always to head in the direction of travel of the recorder.

3. In combination with a turnable trainer, controls therefor, a moving course recorder for indicating any direction of travel, a spindle rotatable in accordance with turns of said trainer, optical means on said spindle for projecting a representation of an aircraft, a translucent map supported above said recorder and receiving said representation, and means for interconnecting said recorder and said optical means automatically to cause said aircraft representation always to head in the direction of travel of the recorder.

4. In combination with a turnable trainer, controls therefor, a moving course recorder for indicating any direction of travel, a spindle rotatable in accordance with turns of said trainer, a marking wheel on said spindle for recording movements of the trainer, optical means on said spindle for projecting a representation of an aircraft, a translucent map supported above said recorder and receiving said representation, and means for interconnecting said recorder and said optical means automatically to cause said aircraft representation always to head in the direction of travel of the recorder.

5. In combination with a turnable trainer, controls therefor, a moving course recorder for indicating any direction of travel, rotatable optical means for projecting a representation of an aircraft, a translucent map supported above said recorder and receiving said representation, and means for interconnecting said recorder and said optical means automatically to cause said aircraft representation always to head in the direction of travel of the recorder.

6. In combination with a turnable trainer, controls therefor, a moving course recorder for indicating any direction of travel, a spindle rotatable in accordance with turns of said trainer, a marking wheel on said spindle for recording movements of the trainer, optical means fixed directly to the marking wheel spindle for projecting a representation of an aircraft, a translucent map supported above said recorder, and means for interconnecting said recorder and said optical means automatically to cause said aircraft representation always to head in the direction of travel of the recorder.

GEORGE EDMUND HILL.
SYDNEY MANSFIELD GOLDSMITH.